US006818585B2

(12) United States Patent
Crowther et al.

(10) Patent No.: US 6,818,585 B2
(45) Date of Patent: Nov. 16, 2004

(54) CATALYST COMPOUNDS, CATALYST SYSTEMS THEREOF AND THEIR USE IN A POLYMERIZATION PROCESS

(75) Inventors: Donna J. Crowther, Seabrook, TX (US); Phillip T. Matsunaga, Houston, TX (US); Ching-Tai Lue, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/955,507

(22) Filed: Sep. 18, 2001

(65) Prior Publication Data

US 2002/0058766 A1 May 16, 2002

Related U.S. Application Data

(63) Continuation of application No. 09/451,805, filed on Dec. 1, 1999, now abandoned, which is a continuation-in-part of application No. 09/222,973, filed on Dec. 30, 1998, now Pat. No. 6,034,192.

(51) Int. Cl.$^7$ .............................. C08F 4/58; C08F 4/642; C08F 4/643
(52) U.S. Cl. ....................... 502/117; 502/103; 502/152; 526/160; 526/166; 526/170; 526/943
(58) Field of Search ............................... 502/103, 117, 502/152; 526/160, 166, 943

(56) References Cited

U.S. PATENT DOCUMENTS

| | | | |
|---|---|---|---|
| 5,281,679 A | 1/1994 | Jejelowo et al. | 526/114 |
| 5,350,817 A | 9/1994 | Winter et al. | 526/119 |
| 5,439,994 A | 8/1995 | Inoue et al. | 526/114 |
| 5,451,649 A | 9/1995 | Zenk et al. | 526/160 |
| 5,470,811 A | 11/1995 | Jejelowo et al. | 502/117 |
| 5,491,205 A * | 2/1996 | Langhauser et al. | 526/121 |
| 5,532,396 A * | 7/1996 | Winter et al. | 556/11 |
| 5,534,473 A | 7/1996 | Welch et al. | 502/117 |
| 5,571,880 A | 11/1996 | Alt et al. | 526/160 |
| 5,594,078 A | 1/1997 | Welch et al. | 526/119 |
| 5,627,247 A | 5/1997 | Alt et al. | 526/160 |
| 5,668,230 A | 9/1997 | Schertl et al. | 526/160 |
| 5,714,427 A | 2/1998 | Winter et al. | 502/117 |
| 5,770,752 A | 6/1998 | Kaufmann et al. | |
| 5,798,427 A | 8/1998 | Foster et al. | 526/352 |
| 6,034,192 A * | 3/2000 | Crowther et al. | 526/166 |
| 6,057,408 A * | 5/2000 | Winter et al. | 526/160 |

FOREIGN PATENT DOCUMENTS

| | | |
|---|---|---|
| CA | 2069602 | 11/1992 |
| CA | 2017190 | 1/2001 |
| EP | 0524624 A3 | 1/1993 |
| EP | 0 643 078 A2 | 8/1994 |
| EP | 666267 | 8/1995 |
| EP | 0672675 A1 | 9/1995 |
| EP | 0316155 B1 | 2/1996 |
| EP | 700937 A2 | 3/1996 |
| EP | 0705851 A2 A3 | 4/1996 |
| EP | 0528041 B1 | 11/1997 |
| EP | 0 955 305 A1 | 11/1999 |
| EP | 0955305 A1 | 11/1999 |
| WO | WO 96/00243 | 1/1996 |
| WO | WO 00/40622 | 7/2000 |
| WO | WO 00/68279 | 11/2000 |

OTHER PUBLICATIONS

Morrison and Boyd, Organic Chemistry Fourth Edition, Allyn and Bacon 1983, p. 1199.*
R. J. Lewis, Hawley's Condensed Chemical Dictionary, John Wiley & Sons 1997, p. 718.*
Chen et al., Organometallics 13 (1994) pp. 748–749.*
"Bia(cycloctatetraenyl)titanium (Uranoceno), A New Class of Sandwhich Complexes That Utilize Atomic Orbitals", Stroitwieser, Jr. and Westerhoff, *Journal of the American Chemical Society*, Dec. 18, 1968, p. 7364.
""Half–Open Metallocenes" of Iron, Ruthenlum, and Osmlum: Synthesis, Characterization, Photoelectron Spectroscopy, and Theoretical Calculations", Glelter, Hyia–Kryspin, Ziegler, Sergeson, Green, Stahl and Emst, *Organometallics* 1989, vol. 8, pp. 298–306.
"Structure of Cyclopentadlenylcyclooctatetraene–Titanium", Kroon and Heimholdt, *J. Organometal. Chem.*, vol. 25 (1970), pp. 451–454.
"The Search for New–Generation Olefin Polymerization Catalysts: Life beyond metallocenee", Britovaek, Gibson and Wass, *Angew. Chem. Int. Ed.*, 1999, vol. 38, pp. 428–447.
*Macromol. Rapid Commun.*, Uozumi et al., 18, 883–889 (1997).
*J. of Polymer Science, Part A: Polymer Chemistry*, Tsai et al., vol. 32, 149–158 (1994).
*Angew. Chem. Int. Ed.*, Leclerc et al., 1998, 37, No. 7, pp 922–925.
*New J. Chem.*, Spaleck et al., vol. 14, No. 6/7, pp. 499–503 (1990).
*RIKEN Review*, Yamaguchi et al., No. 15, pp. 17–18 (1997).

* cited by examiner

*Primary Examiner*—Roberto Rabago
(74) *Attorney, Agent, or Firm*—Jaimes Sher; Darrell E. Warner; Kevin M. Faulkner

(57) ABSTRACT

The present invention relates to a cyclic germanium bridged bulky ligand metallocene-type catalyst compound, a catalyst system thereof, and to its use in a process for polymerizing olefin(s) to produce enhanced processability polymers.

1 Claim, No Drawings

CATALYST COMPOUNDS, CATALYST SYSTEMS THEREOF AND THEIR USE IN A POLYMERIZATION PROCESS

RELATED APPLICATION DATA

The present is a Continuation of U.S. application Ser. No. 09/451,805, filed Dec. 1, 1999, now abandoned, which is a continuation-in-part of U.S. patent application Ser. No. 09/222,973, filed Dec. 30, 1998, now issued as U.S. Pat. No. 6,034,192, issued Mar. 7, 2000.

FIELD OF THE INVENTION

The present invention relates to catalyst compounds, catalyst systems incorporating these compounds and to their use in a process for polymerizing olefin(s). More particularly the catalyst compounds are cyclic germanium bridged bulky ligand metallocene-type catalyst compounds and catalyst system thereof. The invention is also directed to the use of this catalyst system in the polymerization of olefin(s) to produce polymers that have a combination of properties that make them easier to process into various articles of manufacture.

BACKGROUND OF THE INVENTION

Processability is the ability to economically process and shape a polymer uniformly. Processability involves such elements as how easily the polymer flows, melt strength, and whether or not the extrudate is distortion free. Typical bulky ligand metallocene-type catalyzed polyethylenes (mPE) are somewhat more difficult to process than low density polyethylenes (LDPE) made in a high pressure polymerization process. Generally, mPE's require more motor power and produce higher extruder pressures to match the extrusion rate of LDPE's. This is typically evident where a polymer exhibits a low melt index ratio. Typical mPE's also have lower melt strength which, for example, adversely affects bubble stability during blown film extrusion, and they are prone to melt fracture at commercial shear rates. On the other hand, however, mPE's exhibit superior physical properties as compared to LDPE's.

It is now common practice in the industry to add various levels of an LDPE to an mPE to increase melt strength, to increase shear sensitivity, i.e., to increase flow at commercial shear rates; and to reduce the tendency to melt fracture. However, these blends generally have poor mechanical properties as compared with neat mPE.

Traditionally, metallocene catalysts produce polymers having a narrow molecular weight distribution. Narrow molecular weight distribution polymers tend to be more difficult to process. The broader the polymer molecular weight distribution the easier the polymer is to process. A technique to improve the processability of mPE's is to broaden the products' molecular weight distribution (MWD) by blending two or more mPE's with significantly different molecular weights, or by changing to a polymerization catalyst or mixture of catalysts that produce broad MWD polymers.

In the art specific bulky ligand metallocene-type catalyst compound characteristics have been shown to produce polymers that are easier to process. For example, U.S. Pat. No. 5,281,679 discusses bulky ligand metallocene-type catalyst compounds where the bulky ligand is substituted with a substituent having a secondary or tertiary carbon atom for the producing of broader molecular weight distribution polymers. U.S. Pat. No. 5,470,811 describes the use of a mixture of bulky ligand metallocene-type catalysts for producing easy processing polymers. Also, U.S. Pat. No. 5,798,427 addresses the production of polymers having enhanced processability using a bulky ligand metallocene-type catalyst compound where the bulky ligands are specifically substituted indenyl ligands.

A need exists in the industry for catalyst compounds and catalyst systems that in a polymerization process produce polymers having a combination of properties for use in various end-use applications.

SUMMARY OF THE INVENTION

This invention relates to a catalyst compound, a catalysts system thereof and to their use in a polymerization process. The catalyst compound is a cyclic bridge, preferably a cyclic germanium bridged bulky ligand metallocene-type compound. In one embodiment, this cyclic germanium bridged bulky ligand metallocene-type catalyst compound is activated or combined with an activator to form a catalyst system. In another embodiment, the invention is directed to a polymerization process utilizing this catalyst system. The preferred polymerization processes are a gas phase or a slurry phase process, most preferably a gas phase process, especially where the catalyst system is supported.

In one preferred embodiment, the invention provides for a process for polymerizing ethylene alone or in combination with one or more other olefin(s) in the presence of a catalyst system of a cyclic germanium bridged bulky ligand metallocene-type catalyst compound, preferably a cyclic germanium bridged bulky ligand metallocene-type catalyst compound and an activator.

DETAILED DESCRIPTION OF THE INVENTION

Introduction

The invention relates to a catalyst compound, a catalyst system thereof and to it use in a polymerization process for producing polymers having a balance of properties needed for processing the polymers into various end-use applications, such as film. It has been surprisingly discovered that using a cyclic germanium bridged bulky ligand metallocene-type catalyst of the invention, particularly in a slurry or gas phase polymerization process, polymers having a high Melt Index Ratio (MIR) and high Melt Strength (MS) are produced. It was previously found that cyclic bridged bulky ligand metallocene-type catalyst system produce polymers having a high MIR, however, the melt strength needed improvement. For example, U.S. patent application Ser. No. 09/306,142 filed May 6, 1999 now U.S. Pat. No. 6,339,134 illustrates a cyclic silicon bridged bulky ligand metallocene-type catalyst system for producing polymers having a high MIR, which is fully incorporated herein by reference. Also, U.S. patent application Ser. No. 09/222,973 filed Dec. 30, 1998 now U.S. Pat. No. 6,034,192 discusses a germanium bridged bulky ligand metallocene-type catalyst system in a polymerization process for producing polymers having better melt strength, which is fully incorporated herein by reference. It is highly unusual in the art that a combination of catalyst compound structures provide the benefits to a particular polymer product that each bring separately. Thus, it was surprising and totally unexpected that the cyclic germanium bridged bulky ligand metallocene-type catalyst compounds would produce in a polymerization process a polymer having both a high MIR and MS.

Cyclic Ge Bridged Bulky Ligand Metallocene-type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligand is η-bonded to a metal atom, most preferably $\eta^5$-bonded to the metal atom.

For purposes of this patent specification and appended claims a cyclic germanium bridge is one in which the germanium element(s) serves as the bridging element(s) between at least two bulky ligands and "cyclic" refers to the atoms forming a ring or ring system containing the germanium element(s).

The bulky ligands are generally represented by one or more open, acyclic, or fused ring(s) or ring system(s) or a combination thereof. These bulky ligands, preferably ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably 4, 5 and 6, and most preferably the metal is from Group 4.

In one embodiment, cyclic germanium bridged bulky ligand metallocene-type catalyst compounds are represented by the formula:

$$L^A(AGe)L^BMQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic, or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $\eta^3$-bonding to M, and most preferably $\eta^5$-bonding to M. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound. Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methoxy, ethoxy, propoxy, phenoxy, bis(N-methylanilide), dimethylamide, dimethylphosphide radicals and the like.

A is cyclic ring or ring system that includes the Ge atom and preferably contains 3 or greater non-hydrogen atoms, preferably greater than 4 carbon atoms, to form a ring or ring system about the Ge atom. The atoms forming the ring or ring system of A may be substituted with substituents as defined above for R. Non-limiting examples of cyclic bridging groups A include cyclo-tri or tetra-alkylene germyl, for example, cyclotrimethylenegermyl group or cyclotetramethylenegermyl group.

Other examples of cyclic bridging groups are represented by the following structures:

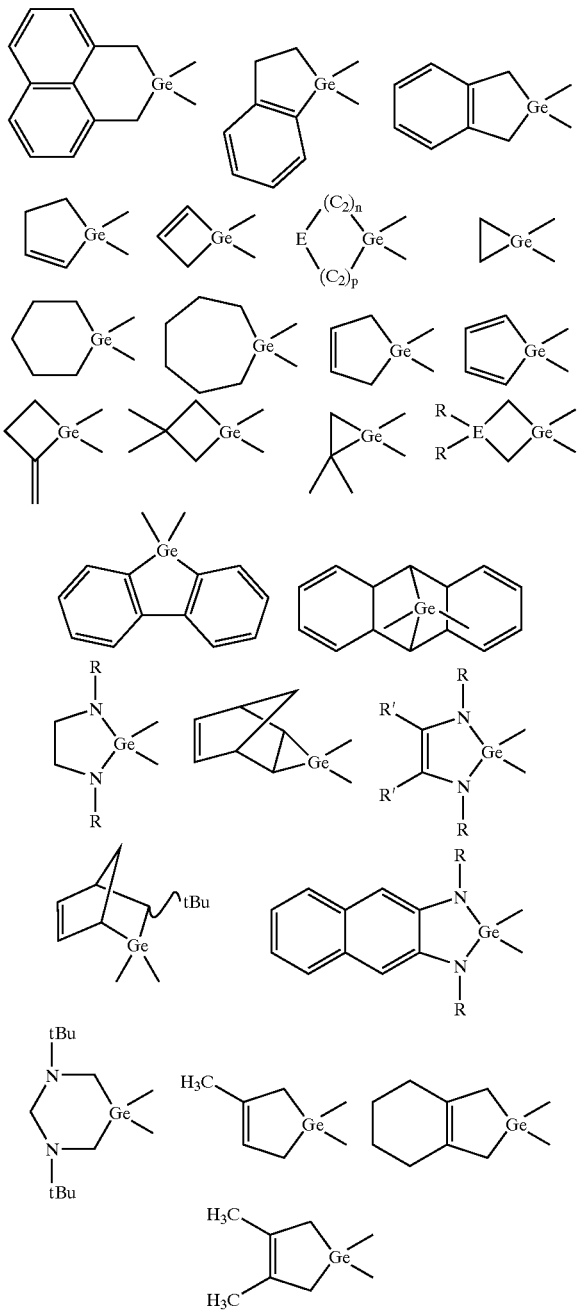

E = BR, CR$_2$, SiR$_2$, GeR$_2$, NR, PR, O, S
n = 0–7; p = 0–7

In a preferred embodiment, the cyclic germanium bridged bulky ligand metallocene-type catalyst compounds of the invention include cyclotrimethylenegermyl(tetramethyl cyclopentadienyl)(cyclopentadienyl)zirconium dichloride, cyclotetramethylenegermyl(tetramethyl cyclopentadienyl)(cyclopentadienyl)zirconium dichloride, cyclotrimethylenegermyl(tetramethyl cyclopentadienyl)(2-methyl indenyl) zirconium dichloride, cyclotrimethylenegermyl(tetramethyl cyclopentadienyl)(3-methyl cyclopentadienyl)zirconium dichloride, cyclotrimethylenegermyl bis(2-methyl indenyl) zirconium dichloride, cyclotrimethylenegermyl(tetramethyl cyclopentadienyl)(2,3,5-trimethyl cyclopentadienyl)zirconium dichloride, cyclotrimethylenegermyl bis(tetra methyl cyclopentadienyl) zirconium dichloride, cyclotetramethylenegermyl bis(tetra methyl cyclopentadienyl)zirconium dichloride, o-xylidenegermyl bis(tetra methyl cyclopentadienyl) zirconium dichloride and 3,4-dimethylcyclotetramethyl-3-enegermyl(tetramethyl cyclopentadienyl)(2,3,5-trimethyl cyclopentadienyl)zirconium dichloride. Also, any of the above specifically named compounds or in conjunction with any of the bulky ligand metallocene-type catalyst compound formulas, the following cyclic germanium bridges are included: 3,4-dimethylcyclotetramethyl-3-enegermyl, 3-methylcyclotetramethyl-3-enegermyl and o-xylidenegermyl.

In another embodiment, the bulky ligand metallocene-type catalyst compound of the invention is represented by the formula:

$$(C_5H_{4-d}R_d)(R'GeR')_x(C_5H_{4-d}R_d)MQg_{-2} \quad (II)$$

where M is a Group 4, 5, 6 transition metal, $(C_5H_{4-d}R_d)$ is an unsubstituted or substituted, cyclopentadienyl ligand or cyclopentadienyl-type bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, $(R'GeR')_x$ is a cyclic bridging group, where Ge is germanium, where the one or more Ge atoms bridge the two $(C_5H_{4-d}R_d)$ rings, and the two R''s form a cyclic ring or ring system with Ge; more particularly, non-limiting examples of cyclic bridging group Ge may be represented by $R'_2Ge$ where the two R''s are joined to form a ring or ring system. In one embodiment, R' is a hydrocarbyl containing a heteroatom, for example boron, nitrogen, oxygen or a combination thereof. The two R''s may be independently, hydrocarbyl, substituted hydrocarbyl, halocarbyl, substituted halocarbyl, hydrocarbyl-substituted organometalloid, halocarbyl-substituted organometalloid, where the two R''s are joined to form a ring or ring system having from 2 to 100 non-hydrogen atoms, preferably from 3 to 50 carbon atoms; and independently, each Q can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclo-metallated hydrocarbyl ligand or other divalent anionic chelating ligand, where g is an integer corresponding to the formal oxidation state of M, and d is an integer selected from 0, 1, 2, 3 or 4 and denoting the degree of substitution, x is an integer from 1 to 4.

In one embodiment, the cyclic bridged bulky ligand metallocene-type catalyst compounds are those where the R substituents on the bulky ligands $L^A$, $L^B$, $(C_5H_{4-d}R_d)$ of formulas (I) and (II) are substituted with the same or different number of substituents on each of the bulky ligands. In another embodiment, the bulky ligands $L^A$, $L^B$, $(C_5H_{4-d}R_d)$ of formulas (I) and (II) are different from each other.

In a preferred embodiment, the bulky ligands of the metallocene-type catalyst compounds of formula (I) and (II) are asymmetrically substituted. In another preferred embodiment, at least one of the bulky ligands $L^A$, $L^B$, $(C_5H_{4-d}R_d)$ of formulas (I) and (II) is unsubstituted.

In the most preferred embodiment, the cyclic germanium bridged metallocene-type catalyst compounds of the invention are achiral.

Other bulky ligand metallocene-type catalysts compounds useful in the invention include cyclic germanium bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference. Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398 and 5,753,578 and PCT publications WO 93/08221, WO 93/08199, WO 95/07140, WO 98/11144 and European publications EP-A-0 578 838, EP-A-0 638 595, EP-B-0 513 380, EP-A1-0 816 372, EP-A2-0 839 834 and EP-B1-0 632 819, all of which are herein fully incorporated by reference.

In another embodiment, the cyclic bridged bulky ligand metallocene-type catalyst compound is represented by the formula:

$$L^C(Ge)JMQ_n \qquad (III)$$

where M is a Group 3 to 10 metal atom or a metal selected from the Group of actinides and lanthanides of the Periodic Table of Elements, preferably M is a Group 4 to 10 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; Ge is bonded to L and J; J is a heteroatom ancillary ligand; and Ge is a cyclic bridging group; Q is a univalent anionic ligand; and n is the integer 0, 1 or 2. In formula (III) above, $L^C$, Ge and J form a fused or linked ring system. In an embodiment, $L^C$ of formula (III) is as defined above for $L^A$ in formula (I), M and Q of formula (III) are as defined above in formula (I).

In another embodiment of this invention the bulky ligand metallocene-type catalyst compound useful in the invention is represented by the formula:

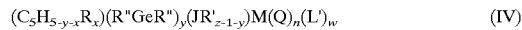

$$(C_5H_{5-y-x}R_x)(R''GeR'')_y(JR'_{z-1-y})M(Q)_n(L')_w \qquad (IV)$$

where M is a transition metal from Group 4 in any oxidation state, preferably, titanium, zirconium or hafnium, most preferably titanium in either a +2, +3 or +4 oxidation state. A combination of compounds represented by formula (IV) with the transition metal in different oxidation states is also contemplated. $L^C$ is represented by $(C_5H_{5-y-x}R_x)$ and is a bulky ligand as described above. For purposes of formula (IV) $R_0$ means no substituent. More particularly $(C_5H_{5-y-x}R_x)$ is a cyclopentadienyl ring or cyclopentadienyl-type ring or ring system which is substituted with from 0 to 4 substituent groups R, and "x" is 0, 1, 2, 3 or 4 denoting the degree of substitution. Each R is, independently, a radical selected from a group consisting of 1 to 30 non-hydrogen atoms. More particularly, R is a hydrocarbyl radical or a substituted hydrocarbyl radical having from 1 to 30 carbon atoms, or a hydrocarbyl-substituted metalloid radical where the metalloid is a Group 14 or 15 element, preferably silicon or nitrogen or a combination thereof, and halogen radicals and mixtures thereof. Substituent R groups also include silyl, germyl, amine, and hydrocarbyloxy groups and mixtures thereof. Also, in another embodiment, $(C_5H_{5-y-x}R_x)$ is a cyclopentadienyl ligand in which two R groups, preferably two adjacent R groups are joined to form a ring or ring system having from 3 to 50 atoms, preferably from 3 to 30 carbon atoms. This ring system may form a saturated or unsaturated polycyclic cyclopentadienyl-type ligand such as those bulky ligands described above, for example, indenyl, tetrahydroindenyl, fluorenyl or octahydrofluorenyl.

The $(JR'_{z-1-y})$ of formula (IV) is a heteroatom containing ligand in which J is an element with a coordination number of three from Group 15 or an element with a coordination number of two from Group 16 of the Periodic Table of Elements. Preferably J is a nitrogen, phosphorus, oxygen or sulfur atom with nitrogen being most preferred. Each R' is, independently, a radical selected from the group consisting of hydrocarbyl radicals having from 1 to 20 carbon atoms, or as defined for R in formula (I) above; the "y" is 1 to 4, preferably 1 to 2, most preferably y is 1, and the "z" is the coordination number of the element J. In one embodiment, in formula (IV), the J of formula (III) is represented by $(JR'_{z-1-y})$.

In formula (IV) each Q is, independently, any univalent anionic ligand such as halogen, hydride, or substituted or unsubstituted hydrocarbyl having from 1 to 30 carbon atoms, alkoxide, aryloxide, sulfide, silyl, amide or phosphide. Q may also include hydrocarbyl groups having ethylenic unsaturation thereby forming a $\eta^3$ bond to M. Also, two Q's may be an alkylidene, a cyclometallated hydrocarbyl or any other divalent anionic chelating ligand. The integer n may be 0, 1, 2 or 3.

The $(R''GeR'')_y$ of formula (IV) is a cyclic bridging group where Ge is a germanium and the two R'''s form a ring or ring system about Ge, preferably, the two R'''s together having from 3 to 100 non-hydrogen atoms, preferably from 3 to 50 carbon atom, and y is preferably an integer from 1 to 4.

Optionally associated with formula (IV) is L', a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

Activator and Activation Methods for the Bulky Ligand Metallocene-type Catalyst Compounds The above described cyclic germanium bridged bulky ligand metallocene-type catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene-type catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor or a trisperfluoronaphthyl boron metalloid precursor that would ionize the neutral bulky ligand metallocene-type catalyst compound.

In one embodiment, an activation method using ionizing ionic compounds not containing an active proton but capable of producing both a bulky ligand metallocene-type catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate). 4THF as an activator for a bulky ligand metallocene-type catalyst compound. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins.

It is further contemplated by the invention that other catalysts can be combined with the cyclic germanium bridged bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference.

In another embodiment of the invention one or more cyclic germanium bridged bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Method for Supporting

The above described cyclic germanium bridged bulky ligand metallocene-type catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a bulky ligand metallocene-type catalyst compound or catalyst system is in a supported form, for example deposited on, bonded to, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), zeolites, and the like. Also, combinations of these support materials may be used, for example, silica-chromium, silica-alumina, silica-titania and the like.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 400 $m^2/g$, pore volume from about 0.8 to about 3.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664 and U.S. application Ser. Nos. 271,598 filed Jul. 7, 1994 now U.S. Pat No. 5,468,702 and 788,736 filed Jan. 23, 1997 now U.S. Pat. No. 6,090,740 and PCT publications WO 95/32995, WO 95/14044, WO 96/06187 and WO 97/02297 all of which are herein fully incorporated by reference.

In one embodiment, the cyclic germanium bridged bulky ligand metallocene-type catalyst compounds of the invention may be deposited on the same or separate supports together with an activator, or the activator may be used in an unsupported form, or may be deposited on a support different from the supported bulky ligand metallocene-type catalyst compounds of the invention, or any combination thereof.

There are various other methods in the art for supporting a polymerization catalyst compound or catalyst system of the invention. For example, the cyclic germanium bridged bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the cyclic germanium bridged bulky ligand metallocene-type catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported cyclic germanium bridged bulky ligand metallocene-type catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene-1.

A preferred method for producing the supported cyclic germanium bridged bulky ligand metallocene-type catalyst system of the invention is described below and is described in U.S. application Ser. Nos. 265,533, filed Jun. 24, 1994 and 265,532, filed Jun. 24, 1994, both abandoned and PCT publications WO 96/00245 and WO 96/00243 both published Jan. 4, 1996, all of which are herein fully incorporated by reference. In this preferred method, the cyclic bridged germanium bulky ligand metallocene-type catalyst compound is slurried in a liquid to form a metallocene solution and a separate solution is formed containing an activator and a liquid. The liquid may be any compatible solvent or other liquid capable of forming a solution or the like with the cyclic germanium bridged bulky ligand metallocene-type catalyst compounds and/or activator of the invention. In the most preferred embodiment the liquid is a cyclic aliphatic or aromatic hydrocarbon, most preferably toluene. The cyclic germanium bridged bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal or metalloid of the activator component to the metal of the supported cyclic germanium bridged bulky ligand metallocene-type catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal or metalloid of the activator component to the metal component of the cyclic germanium bridged bulky ligand metallocene-type catalyst is preferably in the range of between 0.3:1 to 3:1. Where an unsupported cyclic germanium bridged bulky ligand metallocene-type catalyst system is utilized, the mole ratio of the metal or metalloid of the activator component to the metal of the cyclic germanium bridged bulky ligand metallocene-type catalyst compound is in the range of between 0.3:1 to 10,000:1, preferably 100:1 to 5000:1, and most preferably 500:1 to 2000:1.

In one embodiment of the invention, olefin(s), preferably $C_2$ to $C_{30}$ olefin(s) or alpha-olefin(s), preferably ethylene or propylene or combinations thereof are prepolymerized in the presence of the cyclic germanium bridged bulky ligand metallocene-type catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed to a reactor as described in PCT publication WO 97/46599, which is fully incorporated herein by reference.

In one embodiment, the cyclic germanium bridged metallocene-type catalysts of the invention can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

Polymerization Process

The catalysts and catalyst systems of the invention described above are suitable for use in any polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Product of the Invention

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc to about 0.930 g/cc. The melt strength of the polymers produced using the catalyst of the invention are greater than 6 cN, preferably greater than 7 cN, and most preferably 8 cN or higher. For purposes of this patent application and appended claims melt strength is measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in the unit of cN) achieved before the strand breaks or starts to show draw-resonance is determined as the melt strength. The temperature of the rheometer is set at 190° C. The capillary die has a length of one inch (2.54 cm) and a diameter of 0.06" (0.1 5 cm). The polymer melt is extruded from the die at a speed of 3 inch/min (7.62 cm/min). The distance between the die exit and the wheel contact point should be 3.94 inches (100 mm).

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.5 to less than about 8, and most preferably from 3.0 to 8.

In one preferred embodiment, the polymers of the present invention have a $M_z/M_w$ of greater than or equal to 3, preferably greater than 3. $M_z$ is the z-average molecular weight. In another preferred embodiment, the polymers of the invention have a $M_z/M_w$ of greater than or equal to 3.0 to about 4. In yet another preferred embodiment, the $M_z/M_w$ is in the range greater than 3 to less than 4.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene-type catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, polymers produced using a bulky ligand metallocene-type catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 30 to less than 200, more preferably from about 35 to less than 100, and most preferably from 40 to 95.

The polymers of the invention in a preferred embodiment have a melt index ratio ($I_{21}/I_2$) ($I_{21}$ is measured by ASTM-D-1238-F) of from preferably greater than 30, more preferably greater than 35, even more preferably greater that 40, still even more preferably greater than 50 and most preferably greater than 65.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Example 1

Synthesis of C$_6$H$_4$(CH$_2$)$_2$Ge(Me$_4$C$_5$)$_2$]ZrCl$_2$

A solution of C$_6$H$_4$(CH$_2$)$_2$Mg(THF)$_{1.9}$ (3.99 g, 15.0 mmol) in THF (300 mL) was added dropwise to a solution of (Me$_4$C$_5$H)$_2$GeCl$_2$ (5.77 g, 15.0 mmol) in THF (250 mL) at room temperature. After stirring for 18 h, the volatiles were removed under reduced pressure and the residue was extracted with pentane (300 mL). The mixture was filtered and the solution was concentrated and cooled to −25° C. A mass of faint yellow crystals was collected and dried in vacuo. A second crop was obtained for a total yield of 3.32 g (7.92 mmol, 53%) of C$_6$H$_4$(CH$_2$)$_2$Ge(Me$_4$C$_5$H)$_2$.

The C$_6$H$_4$(CH$_2$)$_2$Ge(Me$_4$C$_5$H)$_2$ was dissolved in Et$_2$O (300 mL) and a M solution of t-BuLi in pentane (9, 29 mL, 15.8 mmol) was added dropwise by syringe. After addition, the cloudy mixture was stirred at room temperature for 4 h, and then solid ZrCl$_4$ (1.85 g, 7.94 mmol) was added in portions. After stirring for 18 h, the volatiles were removed under reduced pressure and the residue was extracted with CH$_2$Cl$_2$ (200 mL). The mixture was filtered and the solution was concentrated and cooled to −25° C. A microcrystalline solid was collected and dried in vacuo. A second crop was collected for a total yield of 0.91 g (1.6 mmol, 20%) of [$C_6H_4(CH_2)_2Ge(Me_4C_5)_2$]$ZrCl_2$, a cyclic germanium bridged metal catalyst compound.

The compound produced is represented by the following chemical structure:

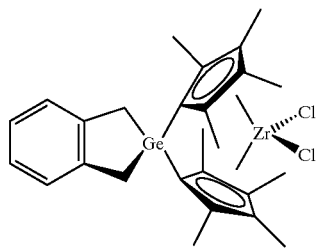

Example 2

Catalyst Preparation for $C_6H_4(CH_2)_2Ge(Me_4C_5)_2$]$ZrCl_2$

To a solution of 31.86 g of 30 wt. % methylalumoxane (MAO) (available from Albemarle Corporation, Baton Rouge, La.) diluted in toluene (32.7 g, Aldrich anhydrous grade stored over molecular sieves) was added 0.78 g (1.35 mmol) [$C_6H_4(CH_2)_2Ge(Me_4C_5)_2$]$ZrCl_2$. The resulting orange solution was stirred for 10 min. and then 25.0 g of silica (MS948, 1.6 cc/g P.V. (P.V.=pore volume), available from W. R. Grace, Davison Chemical Division, Baltimore, Md. previously heated to 600° C. under $N_2$ for 3 hours) was added with swirling. When the mixture was no longer mobile, it was thoroughly homogenized with a spatula. The volatiles were removed in vacuo over 18 h at room temperature. The free flowing catalyst was mixed with 3 wt. % of Aluminum Stearate #22 in a dry box, (AlSt #22 is ($CH_3(CH_2)_{16}COO)_2Al$—OH and is available from Witco Corporation, Memphis, Tenn.), then transferred to a catalyst bomb for testing.

Example 3

Synthesis of [—$CH_2CMe=CMeCH_2$—]Ge($CpMe_4H$)$_2$ (Compound 1)

$GeCl_2$(dioxane) (See JACS, 120(27), 1998, 6743) (3.6 g, 16.1 mmol) was dissolved in 40 ml THF and reacted with 2.0 g butadiene. After the reaction was stirred at room temperature for 1 h., $CpMe_4HLi$ (4.1 g, 32.2 mmol) was added, and the reaction allowed to proceed for 18 h. The volatiles are then removed in vacuo and the crude reaction mixture extracted with $Et_2O$. The $Et_2O$ filtrate is cooled to −35° C. to yield pure Compound 1 as a white solid.

Example 4

Synthesis of [—$CH_2CMe=CMeCH_2$—]Ge($CPMe_4$)$_2ZrCl_2$ (Compound 2)

A sample of 5.6 g of the above Compound 1 made in Example 3 was dissolved in $Et_2O$ and deprotonated with nBuLi. The dianion was isolated, reslurried in $Et_2O$ and reacted with $ZrCl_4$ (3.0 g). The crude reaction was filtered over a glass frit. The crude solid collected was extracted with $CH_2Cl_2$ (3×20 ml), the filtrates reduced and cooled to −35° C. Compound 2 was isolated as a very pale-yellow to white solid (2.1 g). The compound produced is represented by the following chemical structure:

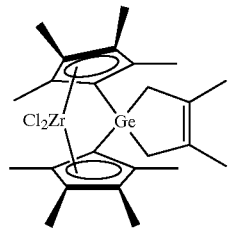

Example 5

Catalyst Preparation 0.60 g of the cyclic germanium bridged metallocene-type catalyst Compound 2 prepared above in Example 4 was slurried in 26 g toluene and reacted with 26 g 30% MAO in toluene (available from Albemarle Corporation, Baton Rouge, La.). To this was added 25 g $SiO_2$ (Davison 948, 600° C., available from W. R. Grace, Davison Chemical Division, Baltimore, Md.). The catalyst system was dried at ambient temperature in vacuo for 18 hr. and loaded in a metal bomb for testing in a gas phase pilot plant.

Comparative Example 6

The compound [$CpMe4$—$GeMe_2$—$CpMe_4$]$ZrCl_2$ (0.52 g) was slurried in 34.5 g toluene and reacted with 34.5 g 30% MAO (available from Albemarle Corporation, Baton Rouge, La.). Silica gel (25 g) (Davison 948, 600° C., available from W. R. Grace, Davison Chemical Division, Baltimore, Md.) was added in increments and mixed with a spatula. The catalyst system was dried at ambient temperature in vacuo for 18 hr. and loaded in a metal bomb for testing in a gas phase pilot plant.

Comparative Example 7

The compound [$CpMe_4$—$SiMe_2$—$CpMe_4$]$ZrCl_2$ (0.74 g) was slurried in 53.5 g toluene and reacted with 53.5 g 30% MAO (available from Albemarle Corporation, Baton Rouge, La.). Silica gel (40 g) (Davison 948, 600° C., available from W. R. Grace, Davison Chemical Division, Baltimore, Md.) was added in increments and mixed with a spatula. The catalyst system was dried at ambient temperature in vacuo for 18 hr. and loaded in a metal bomb for testing in a gas phase pilot plant.

Comparative Example 8

A sample of ($C_3H_6$)Si($C_5Me_4$)$_2$ (0.63 g, 1.33 mmol) was weighed into a beaker an reacted with 32.0 g 30% MAO (available from Albemarle Corporation, Baton Rouge, La.) and 32.0 g toluene and stirred until dissolution (10 min). To the reaction mixture was added 24.0 g silica gel (Davison 948, 600° C., available from W. R. Grace, Davison Chemical Division, Baltimore, Md.) and mixed with a spatula. The resulting mud was dried in vacuo at room temperature for 15 h and transferred into a bomb for screening in a continuous gas phase pilot plant.

Example 9

Polymerization for Examples 2, 5 and Comparative Examples 6 to 8

A continuous cycle fluidized bed gas phase polymerization reactor was used for the polymerization studies for Examples 2, 5 and Comparative Examples 6 to 8 and the results are summarized in Tables 1 and 2. The reactor consists of a 6 inch (15.24 cm) diameter bed section increasing to 10 inches (25.4 cm) at the reactor top. Gas comes in through a perforated distributor plate allowing fluidization of the bed contents and polymer sample is discharged at the reactor top. Gas enters through a perforated distributor plate allowing fluidization of the bed contents and polymer is discharged at the reactor top. Polymer samples were collected after several bed turnovers once the reactor and product were stabilized.

It can be seen from Table 2 below that the polymers produced by the catalyst systems of the invention have both a high melt strength and a high melt index ratio.

While the present invention has been described and illustrated by reference to particular embodiments, those of ordinary skill in the art will appreciate that the invention lends itself to variations not necessarily illustrated herein. For example, it is contemplated that the cyclic germanium bridged metallocene-type catalyst compound of the invention can be combined with one or more non-cyclic bridged metallocene-type catalyst compounds. It is also contemplated that the process of the invention may be used in a series reactor polymerization process. For example, a supported cyclic germanium bridged bulky ligand metallocene-type catalyst compound is used in one reactor and a non-cyclic bridged or unbridged, bulky ligand metallocene-type catalyst compound being used in another or vice-versa. For this reason, then, reference should be made solely to the appended claims for purposes of determining the true scope of the present invention.

TABLE 1

| Example | 2 | 5 | CEx 6 | CEx 7 | CEx 8 |
| --- | --- | --- | --- | --- | --- |
| Temperature (° F.) (° C.) | 175 (79.4) | 175 | 175 | 175 | 168 |
| Pressure (psi) (kPa) | 300 (2067) | 300 | 300 | 300 | 300 |
| Ethylene (mole %) | 35.0 | 35.1 | 35.0 | 35.0 | 30.1 |
| Hydrogen (mole ppm) | 129 | 384 | 88 | 106 | 342 |
| Hydrogen/Ethylene Concentration Ratio | 3.7 | 10.9 | 2.5 | 3.0 | 11.4 |
| Hexene (mole %) | 0.62 | 0.99 | 1.00 | 0.87 | 0.46 |
| Hexene/Ethylene Concentration Ratio | 0.018 | 0.028 | 0.099 | 0.025 | 0.015 |
| Bed Weight (g) | 1903 | 1947 | 1951 | 1930 | 1626 |
| Residence Time (hrs) | 3.6 | 5.0 | 7.0 | 4.8 | 3.0 |
| Productivity[1] (g/g) | 1697 | 750 | 373 | 3458 | 633 |
| Gas Velocity (ft/sec) (cm/sec) | 1.57 (47.9) | 1.58 | 1.59 | 1.57 | 0.553 |
| Production Rate (g/hr) | 533 | 391 | 278 | 400 | 209 |
| Bulk Density (g/cc) | 0.3630 | NM | 0.2988 | 0.3880 | 0.4438 |

[1]Productivity is number of grams of product per gram of catalyst. NM = not measured.

TABLE 2

| Example | 2 | 5 | CEx 6 | CEx 7 | CEx 8 |
| --- | --- | --- | --- | --- | --- |
| Density (g/cc) | 0.923 | 0.9187 | 0.9186 | 0.9193 | 0.9256 |
| Melt Index (g/10 min) | 1.2 | 0.96 | 1.1 | 1.72 | 0.78 |
| Melt Index Ratio ($I_{21}/I_2$) | 37 | 60.0 | 30.0 | 31.7 | 86.3 |
| Melt Strength (cN) | 9.5 | 8.8 | 10.4 | 7.4 | 4.7 |
| 1st M.P. (° C.) | 120.7 | 120.3 | — | — | — |
| 2nd M.P. (° C.) | 113.5 | 103.6 | — | — | — |
| Mn | 30,900 | NM | — | — | — |
| Mw | 113,200 | NM | — | — | — |
| Mz | 342,500 | NM | — | — | — |
| Mw/Mn | 3.67 | NM | — | — | — |
| Mz/Mw | 3.03 | NM | — | — | — |
| CDBI | NM | NM | — | — | — |
| SCB[1] | 12.8 | 16.6 | — | — | — |

[1]Short chain branches per 1000 carbon atoms. NM is not measured.

What is claimed is:

1. A catalyst system for polymerizing ethylene alone or in combination with one or more olefin(s), comprising a cyclic germanium bridged bulky ligand metallocene-type catalyst compound and an activator, where the cyclic germanium bridged bulky ligand metallocene-type catalyst compound is selected from one of the group consisting of cyclotrimethylenegermyl(tetramethyl cyclopentadienyl) (cyclopentadienyl)zirconium dichioride, cyclotetramethylenegermyl(tetramethyl cyclopentadienyl) (cyclopentadienyl)zirconium dichioride, cyclotrimethylenegermyl(tetramethyl cyclopentadienyl) (2-methyl indenyl)zirconium dichloride, cyclotrimethylenegermyl(tetramethyl cyclopentadienyl) (3-methyl cyclopentadienyl)zirconium dichloride, cyclotrimethylonegermyl(tetramethyl cyclopentadienyl) (2,3,5-trimethyl cyclopentadienyl)zirconium diclilolide, cyclotrimethylenegermyl bis(tetra methyl cyclopentadienyl) zirconium dichioride, cyclotetramethylenegermyl (tetramethyl cyclopentadienyl) (3-methyl cyclopentadienyl) zirconium dichioride, cyclotetramethylenegermyl bis(tetra methyl cyclopentadienyl)zirconium dichloride, 3,4-dimethylcyclotetra-methyl-3-enegermyl(tetramethyl cyclopentadienyl) (cyclopentadienyl)zirconium dichioride, 3,4-dimethylcyclotetramethyl-3-enegermylbis(tetramethyl cyclopentadienyl)zirconium dichloride, 3,4-dimethylcyclotetramethyl-3-enegermyl(tetramethyl cyclopentadienyl) (2,3,5-trimethyl cyclopentadienyl) zirconium dichloride, 3-methylcyclotetramethyl-3-enegermyl bis(tetra methyl cyclopentadienyl)zirconium dichloride, 3-methylcyclotetramethyl-3-enegermyl (tetra methyl cyclopentadienyl) (cyclopentadienyl)zirconium dichloride, 3-methylcyclotetramethyl-3-enegermyl(tetra methyl cyclopentadienyl) (3-methylcyclopentadienyl) zirconium dichloride, o-xylidenegermyl bis(tetra methyl cyclopentadienyl)zirconium dichloride, o-xylidenegermyl (tetramnethyl cyclopentadienyl) (cyclopentadienyl) zirconium dichloride, and o-xylidenegermyl(tetramethyl cyclopentadienyl) (3-methylcyclopentadienyl)zirconium dichloride.

* * * * *